US011174138B2

United States Patent
Königsson

(10) Patent No.: US 11,174,138 B2
(45) Date of Patent: Nov. 16, 2021

(54) MOBILE WORKING MACHINE AND METHOD FOR SUPERVISING THE MANOEUVRING OF STABILIZER LEGS INCLUDED IN A MOBILE WORKING MACHINE

(71) Applicant: Cargotec Patenter AB, Ljungby (SE)

(72) Inventor: Hans Königsson, Hudiksvall (SE)

(73) Assignee: Hiab AB, Kista (SE)

( * ) Notice: Subject to any disclaimer, the term of this patent is extended or adjusted under 35 U.S.C. 154(b) by 235 days.

(21) Appl. No.: 16/722,077

(22) Filed: Dec. 20, 2019

(65) Prior Publication Data
US 2020/0198943 A1   Jun. 25, 2020

(30) Foreign Application Priority Data
Dec. 21, 2018   (EP) .................................... 18215327

(51) Int. Cl.
*B66C 23/90* (2006.01)
*B66C 23/80* (2006.01)
*B60P 1/54* (2006.01)

(52) U.S. Cl.
CPC .......... *B66C 23/905* (2013.01); *B60P 1/5433* (2013.01); *B66C 23/80* (2013.01); *B66C 2700/088* (2013.01)

(58) Field of Classification Search
CPC ....... B66C 23/78; B66C 23/80; B66C 23/905; B60P 1/5433
See application file for complete search history.

(56) References Cited

U.S. PATENT DOCUMENTS

| 5,580,095 A | * | 12/1996 | Fukumoto | ............... B66C 23/80 |
| | | | | 280/766.1 |
| 2006/0045661 A1 | * | 3/2006 | Andersson | ............. B66C 23/90 |
| | | | | 414/140.3 |
| 2021/0229965 A1 | * | 7/2021 | Siren | ..................... B66C 23/905 |

FOREIGN PATENT DOCUMENTS

| DE | 10 2004 012 966 A1 | 10/2005 |
| EP | 2 298 689 A2 | 3/2011 |
| EP | 3 369 688 A1 | 2/2018 |
| WO | 2007/053509 A2 | 5/2007 |

\* cited by examiner

*Primary Examiner* — Sang K Kim
*Assistant Examiner* — Nathaniel L Adams
(74) *Attorney, Agent, or Firm* — Dilworth & Barrese, LLP

(57) ABSTRACT

A mobile working machine comprising:
a chassis (5);
stabilizer legs (10) connected to the chassis;
a hydraulic crane (20) carried by the chassis and comprising a crane boom (25) articulately connected to a rotatable column (22) and a lifting cylinder (26) for pivoting this crane boom; and
an electronic control device configured to establish a maximum allowed working pressure for the lifting cylinder while taking into account the contribution to the stability of the mobile working machine against tipping from each stabilizer leg (10) that is in an active supporting position.

The electronic control device prevents a manoeuvring of a stabilizer leg away from the active supporting position if the working pressure of the lifting cylinder is higher than a threshold value corresponding to the value of the maximum allowed working pressure for the lifting cylinder that would ensue in case the stabilizer leg is made to leave the active supporting position.

20 Claims, 2 Drawing Sheets

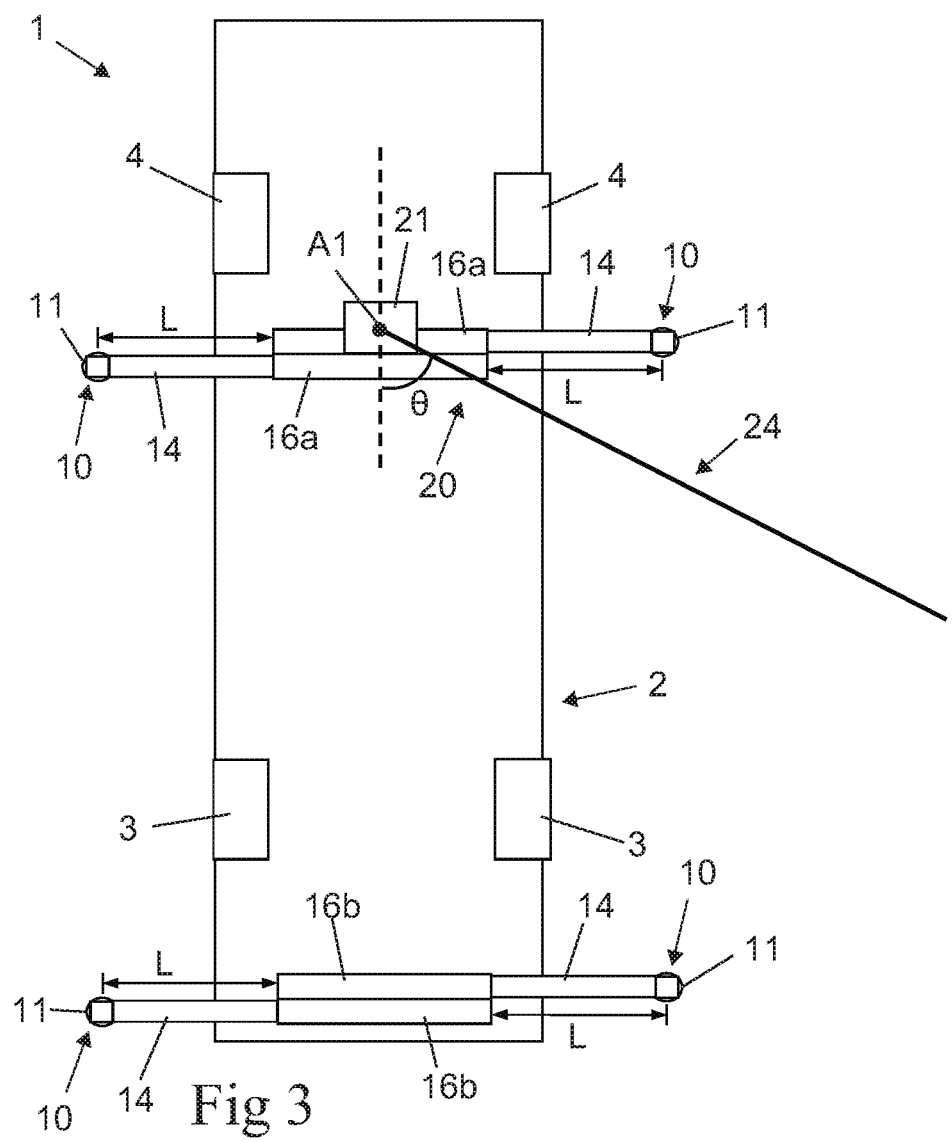
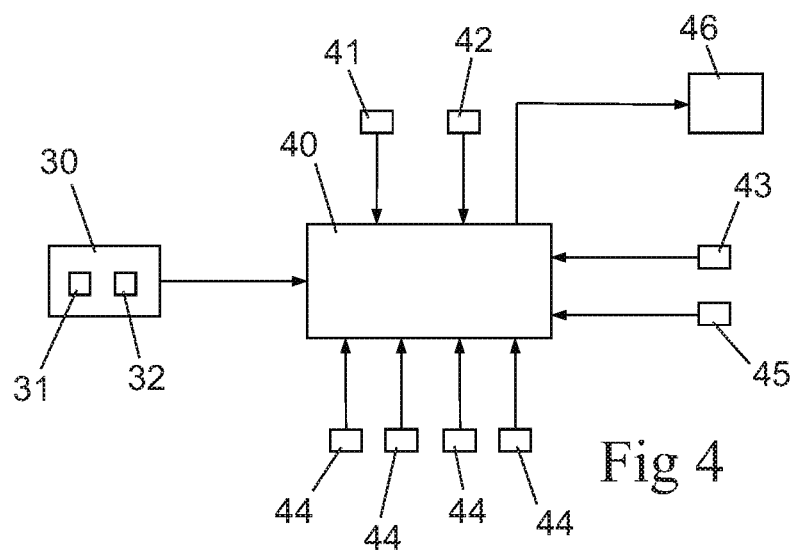

MOBILE WORKING MACHINE AND METHOD FOR SUPERVISING THE MANOEUVRING OF STABILIZER LEGS INCLUDED IN A MOBILE WORKING MACHINE

FIELD OF THE INVENTION AND PRIOR ART

The present invention relates to a mobile working machine according to the description herein. The invention also relates to a method for supervising the manoeuvring of stabilizer legs included in such a mobile working machine.

A mobile working machine equipped with a load handling crane, such as for instance a lorry having a hydraulic loader crane mounted on its chassis, is often provided with hydraulically actuated stabilizer legs for supporting the mobile working machine against the ground to thereby improve the stability of the mobile working machine against tipping. Such a mobile working machine is often provided with an electronic control device that monitors the stability of the mobile working machine against tipping, wherein the electronic control device is configured to make sure that the crane is prevented from being manoeuvred in such a manner that the mobile working machine will tip over due to a tipping moment exerted on the mobile working machine by the crane and the load carried by the crane. This may for instance be achieved by comparing the prevailing working pressure of the lifting cylinder of the crane with a threshold value, which represents the maximum allowed working pressure for the lifting cylinder and which is established by the electronic control device while taking into account the prevailing stability of the mobile working machine against tipping.

Occasionally, a crane operator might need to raise a stabilizer leg from the ground in a situation when the crane of a mobile working machine is in a working position, for instance in order to adjust the position of the mobile working machine or in order to get the stabilizer leg out of the way and allow a vehicle to pass by when the free space around the mobile working machine is restricted. If the crane has such a slewing angle that the stabilizer leg to be raised is included in the tipping line over which the crane boom system of the crane presently extends, there is a risk that the mobile working machine will tip over when the stabilizer leg is raised and no longer supports the mobile working machine against the ground. Thus, if the crane operator misjudges the situation, a manoeuvring of the stabilizer leg out of contact with the ground may result in an accident with severe consequences. In order to reduce the risk for such an accident, it is previously known to apply a threshold value corresponding to a predetermined fixed ratio of the maximum allowed working pressure for the lifting cylinder of the crane in connection with a manoeuvring of a stabilizer leg upwards away from an active supporting position and to allow a stabilizer leg to be raised from the ground only on condition that the prevailing working pressure of the lifting cylinder is equal to or lower than this threshold value.

OBJECT OF THE INVENTION

The object of the present invention is to provide a new and favourable solution to the problem described above.

SUMMARY OF THE INVENTION

According to the present invention, said object is achieved by means of a mobile working machine having the features defined herein.

The mobile working machine of the present invention comprises an electronic control device that is configured to establish a maximum allowed working pressure for the lifting cylinder of the crane while taking into account the contribution to the stability of the mobile working machine against tipping from each stabilizer leg that is in an active supporting position in supporting contact with the ground. According to the invention, the electronic control device is configured to prevent a manoeuvring of a stabilizer leg from the active supporting position towards a raised inactive position if it is established by the electronic control device that the prevailing working pressure of the lifting cylinder is higher than a variable threshold value established by the electronic control device as a value corresponding to the value of the maximum allowed working pressure for the lifting cylinder that would ensue in case the stabilizer leg in question is made to leave the active supporting position, wherein the electronic control device is configured to enable such a manoeuvring of the stabilizer leg if it is established by the electronic control device that the prevailing working pressure of the lifting cylinder is lower than said threshold value.

The solution according to the invention implies that the electronic control device, before effecting an ordered manoeuvring of a stabilizer leg away from the active supporting position, always will check whether or not the stability of the mobile working machine against tipping will be maintained without the support from the stabilizer leg in question. It is hereby ensured that no tipping of the mobile working machine will be caused by a manoeuvring of a stabilizer leg out of contact with the ground.

Furthermore, this solution also implies that the possibility for the crane operator to achieve a manoeuvring of a stabilizer leg from the active supporting position to a raised inactive position is not unnecessarily restricted, due to the fact that such a manoeuvring only is prevented in a situation when the contribution from the stabilizer leg in question to the stability of the mobile working machine against tipping is necessary in order to avoid a tipping accident.

According to an embodiment of the invention, the electronic control device is, when a switching over from a second operating mode for control of crane boom movements into a first operating mode for control of stabilizer leg movements has been effected, configured to establish such a threshold value for each stabilizer leg that is in the active supporting position and to compare the prevailing working pressure of the lifting cylinder with each threshold value in order to establish which ones of these stabilizer legs that at present are to be enabled to be manoeuvred from the active supporting position towards the inactive position. The prevailing stability situation with respect to all stabilizer legs is hereby established by the electronic control device, which implies that the electronic control device immediately knows whether or not a subsequently ordered manoeuvring of a stabilizer leg away from its active supporting position may be effected or not.

According to another embodiment of the invention, the electronic control device is in said first operating mode configured to indicate on a display the individual stabilizer legs that at present are enabled to be manoeuvred from the active supporting position towards the inactive position. It is hereby possible for the crane operator, by viewing the information on the display, to be informed about the possibility to effect a manoeuvring of any of the stabilizer legs away from the active supporting position.

According to another embodiment of the invention, the electronic control device is in said first operating mode configured to establish such a threshold value for a stabilizer leg and compare the prevailing working pressure of the lifting cylinder with this threshold value when it has been established by the electronic control device, based on control signals from a manoeuvring unit, that the crane operator has ordered a manoeuvring of the stabilizer leg in question from the active supporting position towards the raised inactive position or has selected the stabilizer leg in question for subsequent manoeuvring. With this alternative, the electronic control device effects the calculations in question with respect to one stabilizer leg at a time and only when there is an indication that the crane operator wants to effect a manoeuvring of a specific stabilizer legs away from the active supporting position. Hereby, the processing capacity required for the surveillance function in question will be reduced.

Further advantageous features of the mobile working machine according to the present invention will appear from the description following below.

The invention also relates to a method having the features defined herein.

Further advantageous features of the method according to the present invention will appear from the description following below.

BRIEF DESCRIPTION OF THE DRAWINGS

The invention will in the following be more closely described by means of embodiment examples, with reference to the appended drawings. In the drawings:

FIG. 4 is an outline diagram of components included in a mobile working machine according to the invention.

DETAILED DESCRIPTION OF EMBODIMENTS OF THE INVENTION

Figure 1:
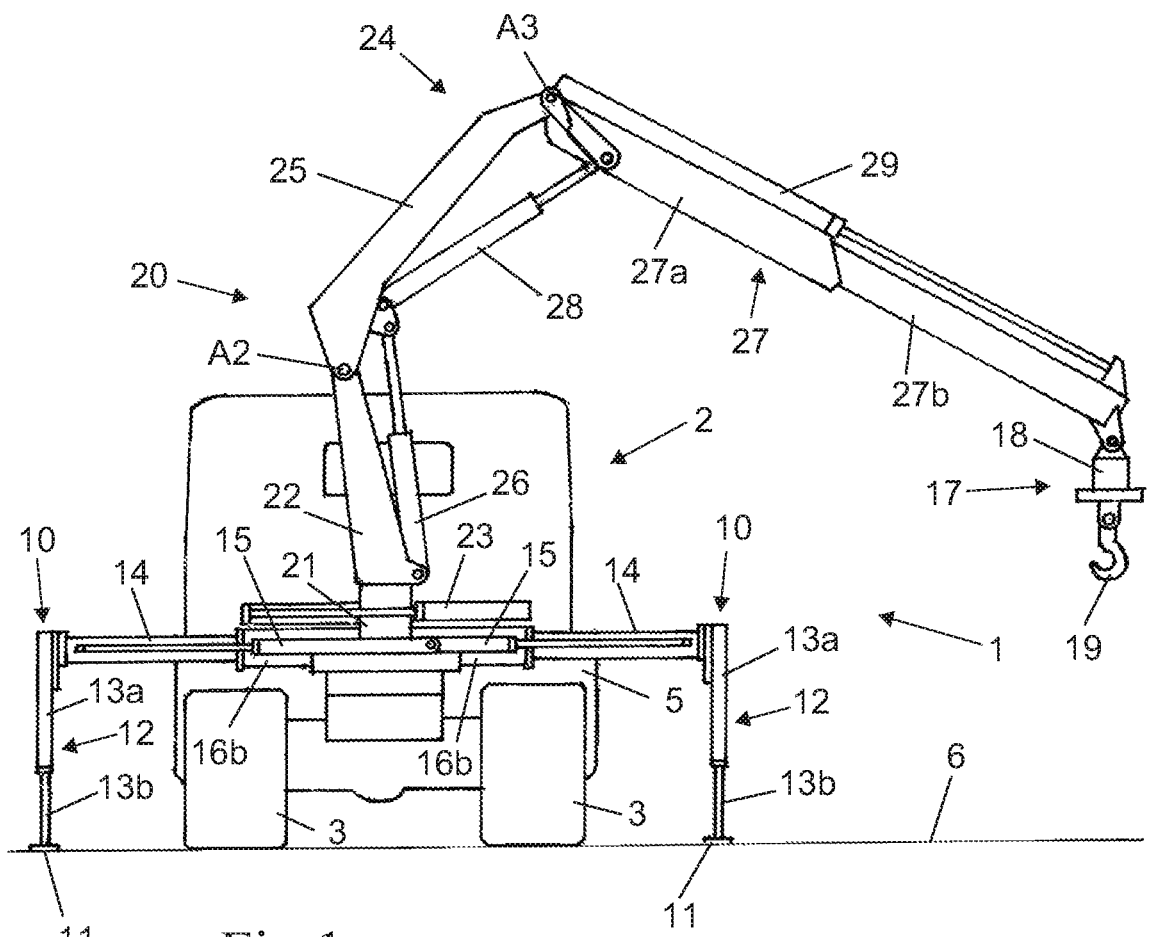
FIG. 1 is a schematic rear view of a mobile working machine according to an embodiment of the present invention, FIG. 2 a schematic perspective view of a manoeuvring unit with a number of manoeuvring members for controlling stabilizer leg movements and different crane functions, FIG. 3 a schematic planar view of the mobile working machine of FIG. 1.

A mobile working machine 1 according to an embodiment of the present invention is very schematically illustrated in FIGS. 1 and 3. The mobile working machine 1 comprises a vehicle 2 provided with load-bearing vehicle wheels 3, 4 and a chassis 5 supported by the vehicle wheels. In the illustrated example, the vehicle 2 is a lorry provided with two rear wheels 3 and two front wheels 4, but the vehicle 2 could also be provided with a larger number of load-bearing vehicle wheels than here illustrated. A hydraulic crane 20 is mounted on and carried by the chassis 5. The crane 20 may be fixed directly to the chassis 5 or fixed to a subframe, which in its turn is fixed to the chassis 5.

The mobile working machine 1 comprises two or more stabilizer legs 10 for supporting the mobile working machine against the ground 6. In the illustrated embodiment, the mobile working machine 1 is provided with four stabilizer legs 10, wherein two stabilizer legs 10 are arranged on one side of the longitudinal axis of the vehicle 2 and two stabilizer legs 10 are arranged on the opposite side of the longitudinal axis of the vehicle. The mobile working machine could alternatively be provided with a larger or smaller number of stabilizer legs than here illustrated. The stabilizer legs 10 are connected to the chassis 5 of the vehicle 2. Each stabilizer leg 10 may comprise a foot plate 11, which is arranged at a lower end of the stabilizer leg.

Each stabilizer leg 10 has an actuating member 12, preferably in the form of a hydraulic cylinder, by means of which the stabilizer leg is manoeuvrable between a raised inactive position, in which the stabilizer leg is out of contact with the ground 6, and an active supporting position (see FIG. 1), in which the stabilizer leg is lowered into supporting contact with the ground. In the active supporting position, the stabilizer leg 10 is pressed against the ground 6.

In the illustrated embodiment, the actuating member 12 of each stabilizer leg 10 has the form of a hydraulic cylinder with a cylinder part 13a, which forms an upper part of the stabilizer leg, and a piston rod 13b, which forms a lower part of the stabilizer leg. The piston rod 13b is at its upper end fixed to a piston (not shown), which is received in the cylinder part 13a and displaceable in relation to it. A foot plate 11 may be fixed to the lower end of the piston rod 13b.

In the illustrated embodiment, each stabilizer leg 10 is mounted to an extension arm 14 at an outer end thereof. The extension arm 14 is telescopically extensible by means of an actuating member 15, preferably in the form of a hydraulic cylinder, in order to allow an adjustment of the horizontal extension length thereof and thereby an adjustment of the horizontal extension length L of the associated stabilizer leg 10. As an alternative, each extension arm 14 could be manually extensible. By adjustment of the extension length of the extension arm 14, the stabilizer leg 10 is moveable in horizontal direction in relation to the chassis 5 of the vehicle 2 from a retracted position close to the chassis 5 to an advanced position at a distance from the chassis. Furthermore, the stabilizer leg 10 is extensible in vertical direction in relation to the extension arm 14, and thereby in relation to the chassis 5, under the effect of the actuating member 12 of the stabilizer leg 10.

Each extension arm 14 is slidably mounted to a support beam 16a, 16b, which in its turn is connected to the chassis 5 of the vehicle 2. In the embodiment illustrated in FIG. 3, the support beams 16a of a first pair of stabilizer legs are rigidly mounted to a crane base 21 of the hydraulic crane 20, wherein these support beams 16a are connected to the chassis 5 via the crane base 21, and the support beams 16b of a second pair of stabilizer legs are rigidly mounted directly to the chassis 5 at a rear end of the vehicle 2.

In the illustrated embodiment, the hydraulic crane 20 comprises:
 a crane base 21, which is fixed to and carried by the chassis 5 of the vehicle 2;
 a column 22, which is rotatably mounted to the crane base 21 so as to be rotatable in relation to the crane base about an essentially vertical axis of rotation A1 (see FIG. 3) by means of an actuating member 23, and
 a crane boom system 24 carried by the column 22.

The crane boom system 24 comprises a first liftable and lowerable crane boom 25, which is articulately connected to the column 22 in such a manner that it is pivotable in relation to the column about an essentially horizontal axis of rotation A2, and an actuating member in the form of a hydraulic cylinder 26, here denominated lifting cylinder, for lifting and lowering the first crane boom 25 in relation to the column 22.

In this description and the subsequent claims, the expression "liftable and lowerable crane boom" refers to a crane boom which can be pivoted in a vertical plane so as to thereby perform liftings and lowerings of a load carried by the crane. The expression "hydraulic cylinder for lifting and lowering the crane boom" here refers to the hydraulic cylinder which is associated with the liftable and lowerable crane boom and which carries out the pivoting thereof in a vertical plane.

In the illustrated embodiment, the crane boom system 24 also comprises a liftable and lowerable second crane boom 27, which is articulately connected to the first crane boom 25 in such a manner that it is pivotable in relation to the first crane boom about an essentially horizontal axis of rotation A3, and an actuating member in the form of a hydraulic cylinder 28 for lifting and lowering of the second crane boom 27 in relation to the first crane boom 25. The second crane boom 27 is telescopically extensible to enable an adjustment of the extension length thereof. The second crane boom 27 comprises a base section 27a, through which the second crane boom 27 is articulately connected to the first crane boom 25, and a telescopic crane boom section 27b which is carried by the base section 27a and displaceable in the longitudinal direction of the base section by means of an actuating member in the form of a hydraulic cylinder 29 for adjustment of the extension length of the second crane boom 27. The second crane boom 27 could as an alternative be provided with two or more telescopic crane boom sections.

In the illustrated embodiment, the crane boom system 24 of the crane 20 is formed by the first crane boom 25 and the second crane boom 27 and the associated hydraulic cylinders 26, 28, 29. However, the crane boom system 24 of the crane 20 may as an alternative include only one liftable and lowerable crane boom or more than two liftable and lowerable crane booms articulately connected to each other.

In the illustrated example, a load handling tool 17 provided with a rotator 18 and a lifting hook 19 is articulately connected to a boom tip at the outer end of the second crane boom 27. As an alternative, any other suitable type of load handling tool may be connected to the boom tip. In order to extend the reach of the crane 20, i.e. the possible range of the lifting operations, an additional crane boom, a so-called jib, may be temporarily and detachably mounted to the outer end of the second crane boom 27.

Figure 2:
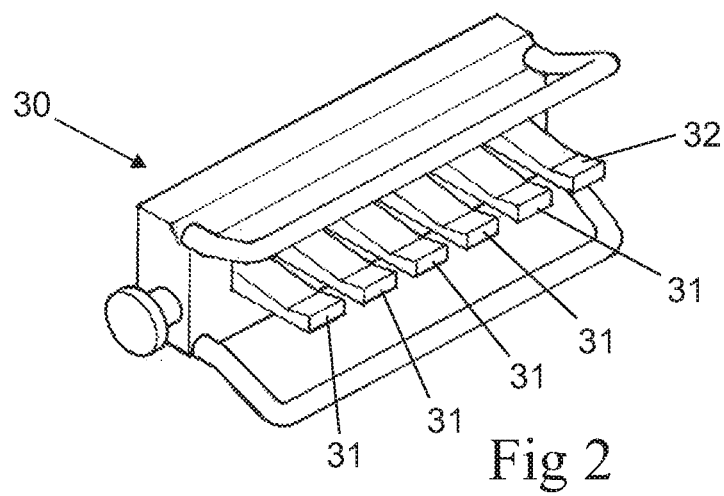

The mobile working machine 1 comprises a manoeuvring unit 30, for instance in the form of a portable manoeuvring unit of the type illustrated in FIG. 2, with one or more manoeuvring members 31 configured to be manoeuvrable by a crane operator in order to control the movements of the crane booms 25, 27 of the crane boom system 24 and the movements of the stabilizer legs 10. As an alternative or in addition to a portable manoeuvring unit, a manoeuvring unit may be located at the mobile working machine, for instance as an integral part of the crane or the stabilizer leg equipment. Control signals are transmitted via cable or a wireless connection from the manoeuvring unit 30 to an electronic control device 40 (very schematically illustrated in FIG. 4), which in its turn is configured to control the actuating members 12, 15, 23, 26, 28, 29 of the stabilizer legs 10, the extension arms 14 and the crane 20 in a conventional manner, and thereby the crane boom movements and stabilizer leg movements, on the basis of control signals from the manoeuvring unit 30 related to the manoeuvring of the manoeuvring members 31. The electronic control device 40 comprises a microprocessor or the similar for processing the control signals from the manoeuvring unit 30.

At least two different operating modes are provided for the manoeuvring unit 30 and the electronic control device 40. In a first operating mode, the manoeuvring unit 30 and the electronic control device 40 are configured to control the actuating members 12 of the stabilizer legs 10 and the actuating members 15 of the extension arms 14 to thereby control the movements of the stabilizer legs 10. In a second operating mode, the manoeuvring unit 30 and the electronic control device 40 are configured to control the actuating members 23, 26, 28, 29 of the crane 20 to thereby control the movements of the crane booms 25, 27. The mobile working machine 1 comprises switching means 32 by means of which the crane operator may switch between the first operating mode and the second operating mode. The switching means 32 may for instance have the form of a maneuvering member on the manoeuvring unit 30 or a menu-guided interface with a function which can be selected by the crane operator in order to select the desired operating mode.

The electronic control device 40 is, in a conventional manner, configured to establish a maximum allowed working pressure for the lifting cylinder 26 while taking into account the contribution to the stability of the mobile working machine 1 against tipping from each stabilizer leg 10 that is in the active supporting position. This maximum allowed working pressure for the lifting cylinder 26 is for instance established by the electronic control device 40 in the manner described in EP 2 298 689 B1 or in any other suitable manner.

The mobile working machine 1 comprises a pressure sensor 41 configured to measure the hydraulic pressure on the piston side of the lifting cylinder 26. The electronic control device 40 is connected to the pressure sensor 41 in order to receive measuring signals from this sensor related to said hydraulic pressure. In the second operating mode, the electronic control device 40 continuously reads the output signal from the pressure sensor 41 and compares this output signal with the established value for the maximum allowed working pressure for the lifting cylinder 26. If the pressure sensed by the pressure sensor 41 exceeds the established maximum allowed working pressure for the lifting cylinder 26, the electronic control device 40 may be configured to stop any presently executed movement of the crane boom system 24.

In the example described above, the electronic control device 40 is configured to let the maximum allowed working pressure for the lifting cylinder 26 represent the maximum allowed hydraulic pressure on the piston side of the lifting cylinder. However, the electronic control device 40 could as an alternative be configured to let the maximum allowed working pressure for the lifting cylinder 26 represent the maximum allowed differential pressure in the lifting cylinder. This differential pressure is defined as the hydraulic pressure on the piston side of the lifting cylinder 26 minus the hydraulic pressure on the piston rod side of the lifting cylinder divided by the cylinder ratio. In this case, the electronic control device 40 is also configured to receive measuring signals from a pressure sensor 42 which measures the hydraulic pressure on the piston rod side of the lifting cylinder 26 so as to thereby be able to establish the prevailing differential pressure in the lifting cylinder and compare this differential pressure with the established value of the maximum allowed working pressure for the lifting cylinder. The expression "working pressure" as used in this description and the claims, consequently refers either to the hydraulic pressure on the piston side of the lifting cylinder 26 or the differential pressure in the lifting cylinder.

When establishing the maximum allowed working pressure for the lifting cylinder 26, the electronic control device 40 is preferably configured to take into account the prevailing slewing angle $\theta$ of the column 22 in relation to the chassis 5 of the vehicle 2 and the horizontal extension length L of each stabilizer leg 10 that is in the active supporting position. The slewing angle $\theta$ of the column 22 in relation to the chassis 5 is established by means of a sensor 43 which continuously senses the slewing position of the column.

The mobile working machine 1 also comprises sensors 44 for establishing the horizontal extension length L of each stabilizer leg 10. These sensors 44 could be configured to sense the displacement position of the extension arms 14 or the displacement position of a movable part, such as a piston rod, of the actuating members 15 of the extension arms 14.

Furthermore, the mobile working machine 1 comprises means 45 for providing measuring signals to the electronic control device 40 that make it possible for the electronic control device to establish when the individual stabilizer legs 10 are in the active supporting position. When the actuating members 12 of the stabilizer legs 10 consist of hydraulic cylinders, these means 45 may comprise pressure sensors for sensing the hydraulic pressure on the piston side and on the piston rod side of each one of these hydraulic cylinders 12 to thereby enable the electronic control device 40 to establish the differential pressure in each one these hydraulic cylinders 12. The electronic control device 40 may then, in a conventional manner, establish whether or not an individual stabilizer leg 10 is in the active supporting position while taking into account the prevailing differential pressure in the associated hydraulic cylinder 12.

In order to prevent the mobile working machine 1 from tipping due to an inappropriate manoeuvring of a stabilizer leg 10 out of contact with the ground, the electronic control device 40 is configured to prevent a manoeuvring of a stabilizer leg 10 from the active supporting position towards the inactive position if it is established by the electronic control device 40 that the prevailing working pressure of the lifting cylinder 26 is higher than a variable threshold value $V_{th}$ established by the electronic control device 40 as a value corresponding to the value of the maximum allowed working pressure for the lifting cylinder 26 that would ensue in case the stabilizer leg 10 in question is made to leave the active supporting position, wherein the electronic control device 40 is configured to enable such a manoeuvring of the stabilizer leg 10 if it is established by the electronic control device 40 that the prevailing working pressure of the lifting cylinder 26 is equal to or lower than said threshold value $V_{th}$. The threshold value $V_{th}$ represents the value of the maximum allowed working pressure for the lifting cylinder 26 that would ensue if the possible contribution from the stabilizer leg 10 in question to the stability of the mobile working machine 1 against tipping is lost in the prevailing position of the crane boom system 24. Thus, before a stabilizer leg 10 is allowed to be manoeuvred from the active supporting position towards the inactive position, and thereby before the possible contribution from this stabilizer leg 10 to the stability of the mobile working machine 1 against tipping is lost, the electronic control device 40 will establish whether or not such a manoeuvring of this stabilizer leg 10 would result in a risk for tipping of the mobile working machine 1, and the electronic control device 40 will only allow such a manoeuvring of the stabilizer leg 10 if the situation is such that there is no such risk.

When the electronic control device 40 enables a manoeuvring of a stabilizer leg 10 from the active supporting position towards the inactive position, the electronic control device will control the actuating member 12 of the stabilizer leg to effect a manoeuvring of the stabilizer leg upwards away from the ground if the crane operator orders such a movement of the stabilizer leg by means of the manoeuvring unit 30.

When the electronic control device 40 prevents a manoeuvring of a stabilizer leg 10 from the active supporting position towards the inactive position, the electronic control device will not allow the actuating member 12 of the stabilizer leg to effect a manoeuvring of the stabilizer leg upwards away from the ground if the crane operator orders such a movement of the stabilizer leg by means of the manoeuvring unit 30. In the case that the manoeuvring of a stabilizer leg is prevented by the electronic control device 40, the electronic control device may also issue an alert to the crane operator through the manoeuvring unit or in any other suitable manner, such as for instance by means of indicator lamps etc.

According to a first alternative, the electronic control device 40 is in the first operating mode configured to establish a threshold value $V_{th}$ of the above-mentioned type for each stabilizer leg 10 that is presently in the active supporting position and to compare the prevailing working pressure of the lifting cylinder 26 with each threshold value $V_{th}$ in order to establish which ones of these stabilizer legs 26 that at present are to be enabled to be manoeuvred from the active supporting position towards the inactive position, on condition that only one stabilizer leg is raised from the active supporting position and the other stabilizer legs remain in the active supporting position. In this case, the electronic control device 40 may be configured to indicate on a user display 46 the individual stabilizer legs 10 that at present are enabled to be manoeuvred from the active supporting position towards the inactive position if the other stabilizer legs remain in the active supporting position. As an example, each stabilizer leg 10 that is presently enabled to be raised from the active supporting position may be marked with green colour on the display 46 and each stabilizer leg that is presently prevented from being raised from the active supporting position may be marked with red colour on the display.

According to another alternative, the electronic control device 40 is in the first operating mode configured to establish a threshold value $V_{th}$ of the above-mentioned type for a stabilizer leg 10 and compare the prevailing working pressure of the lifting cylinder 26 with this threshold value $V_{th}$ when it has been established by the electronic control device 40, based on control signals from the manoeuvring unit 30, that the crane operator, by acting on a dedicated manoeuvring member on the manoeuvring unit 30, has ordered a manoeuvring of the stabilizer leg in question from the active supporting position towards the inactive position or selected the stabilizer leg in question for subsequent manoeuvring.

If the control system of the mobile working machine is so configured that it is possible for the crane operator to manoeuvre two or more stabilizer legs simultaneously, the electronic control device 40 is configured to prevent a simultaneous manoeuvring of two or more stabilizer legs 10 from the active supporting position towards the inactive position if it is established by the electronic control device 40 that the prevailing working pressure of the lifting cylinder 26 is higher than a variable threshold value $V_{th}$ established by the electronic control device 40 as a value corresponding to the value of the maximum allowed working pressure for the lifting cylinder 26 that would ensue in case the stabilizer legs 10 in question are made to leave the active supporting position, wherein the electronic control device 40 is configured to enable such a manoeuvring of the stabilizer legs in question if it is established by the electronic control device 40 that the prevailing working pressure of the lifting cylinder 26 is equal to or lower than said threshold value $V_{th}$. In this case, the threshold value $V_{th}$ represents the value of the maximum allowed working pressure for the lifting cylinder 26 that would ensue if the possible contribution from the stabilizer legs in question to the stability of the mobile working machine 1 against tipping is lost in the prevailing position of the crane boom system 24. Thus, before two or more stabilizer legs 10 are allowed to be simultaneously manoeuvred from the active supporting position towards the inactive position, and thereby before the possible contribution from these stabilizer legs 10 to the stability of the mobile working machine 1 against tipping is lost, the electronic control device 40 will establish whether or not such a manoeuvring of these stabilizer legs 10 would result in a risk for tipping of the mobile working machine 1, and the electronic control device 40 will only allow such a manoeuvring of these stabilizer legs 10 if the situation is such that there is no such risk.

The electronic control device 40 may be implemented by one single electronic control unit or by two or more mutually co-operating electronic control units.

In the embodiment illustrated in FIG. 1, the mobile working machine 1 is a lorry provided with a hydraulic loader crane in the form of a lorry crane. As an alternative, the mobile working machine of the present invention could be a lorry provided with a hydraulic loader crane in the form of a forestry crane, or any other type of loader crane. The mobile working machine 1 of the present invention could also be a so-called mobile crane.

The invention is of course not in any way limited to the embodiments described above. On the contrary, several possibilities to modifications thereof should be apparent to a person skilled in the art without thereby deviating from the basic idea of the invention as defined in the appended claims.

The invention claimed is:

1. A mobile working machine, comprising:
   a chassis (5);
   two or more stabilizer legs (10) for supporting the mobile working machine (1) against the ground, wherein the stabilizer legs (10) are connected to the chassis (5), each stabilizer leg (10) having an actuating member (12), in the form of a hydraulic cylinder, by which the stabilizer leg is manoeuvrable between an inactive position, in which the stabilizer leg is out of contact with the ground, and an active supporting position, in which the stabilizer leg is in supporting contact with the ground;
   a hydraulic crane (20), which is carried by the chassis (5) and comprises:
   a crane base (21) fixed to the chassis (5),
   a column (22), which is rotatably mounted to the crane base (21) to be rotatable in relation to the crane base about an essentially vertical axis of rotation, and
   a crane boom system (24) carried by the column (22), wherein the crane boom system (24) comprises at least a first liftable and lowerable crane boom (25), which is articulately connected to the column (22), and a hydraulic lifting cylinder (26) for lifting and lowering the first crane boom (25) in relation to the column (22); and
   an electronic control device (40), which is configured to establish a maximum allowed working pressure for the lifting cylinder (26) while taking into account the contribution to the stability of the mobile working machine (1) against tipping from each stabilizer leg (10) that is in the active supporting position, wherein the electronic control device (40) is configured to prevent a manoeuvring of a stabilizer leg (10) from the active supporting position towards the inactive position if it is established by the electronic control device (40) that the prevailing working pressure of the lifting cylinder (26) is higher than a variable threshold value (Vth) established by the electronic control device (40) as a value corresponding to the value of the maximum allowed working pressure for the lifting cylinder (26) that would ensue in case the stabilizer leg (10) in question is made to leave the active supporting position, and
   the electronic control device (40) is configured to enable such a manoeuvring of the stabilizer leg (10) if it is established by the electronic control device (40) that the prevailing working pressure of the lifting cylinder (26) is lower than said threshold value (Vth).

2. A mobile working machine according to claim 1, wherein the electronic control device (40) is configured to prevent a simultaneous manoeuvring of two or more stabilizer legs (10) from the active supporting position towards the inactive position if it is established by the electronic control device (40) that the prevailing working pressure of the lifting cylinder (26) is higher than a variable threshold value (Vth) established by the electronic control device (40) as a value corresponding to the value of the maximum allowed working pressure for the lifting cylinder (26) that would ensue in case the stabilizer legs (10) in question are made to leave the active supporting position, wherein the electronic control device (40) is configured to enable such a manoeuvring of the stabilizer legs (10) in question if it is established by the electronic control device (40) that the prevailing working pressure of the lifting cylinder (26) is lower than said threshold value (Vth).

3. A mobile working machine according to claim 2, wherein
   the mobile working machine (1) comprises a manoeuvring unit (30) with one or more maneuvering members (31) configured to be manoeuvrable by a crane operator to control movements of the crane booms (25, 27) of the crane boom system (24) and movements of the stabilizer legs (10);
   the electronic control device (40) is configured to control crane boom movements and stabilizer leg movements on the basis of control signals from the manoeuvring unit (30) related to the manoeuvring of said one or more maneuvering members (31);
   at least two different operating modes are provided for the manoeuvring unit (30) and the electronic control device (40), wherein the manoeuvring unit (30) and the electronic control device (40) in a first operating mode are configured to control stabilizer leg movements and in a second operating mode are configured to control crane boom movements; and
   the mobile working machine (1) comprises switching means (32), of which the crane operator may switch between the first operating mode and the second operating mode.

4. A mobile working machine according to claim 2, wherein the electronic control device (40), when establishing said threshold value (Vth), is configured to take into account the prevailing slewing angle (θ) of the column (22) in relation to the chassis (5) and the horizontal extension length (L) of any other stabilizer leg (10) that is in the active supporting position.

5. A mobile working machine according to claim 4, wherein
   the mobile working machine (1) comprises a manoeuvring unit (30) with one or more maneuvering members (31) configured to be manoeuvrable by a crane operator to control movements of the crane booms (25, 27) of the crane boom system (24) and movements of the stabilizer legs (10);

the electronic control device (40) is configured to control crane boom movements and stabilizer leg movements on the basis of control signals from the manoeuvring unit (30) related to the manoeuvring of said one or more maneuvering members (31);

at least two different operating modes are provided for the manoeuvring unit (30) and the electronic control device (40), wherein the manoeuvring unit (30) and the electronic control device (40) in a first operating mode are configured to control stabilizer leg movements and in a second operating mode are configured to control crane boom movements; and the mobile working machine (1) comprises switching means (32), of which the crane operator may switch between the first operating mode and the second operating mode.

6. A mobile working machine according to claim 5, wherein the electronic control device (40) in the first operating mode is configured to establish such a threshold value (Vth) for each stabilizer leg (10) that is in the active supporting position and to compare the prevailing working pressure of the lifting cylinder (26) with each threshold value (Vth) to establish which ones of these stabilizer legs (10) that at present are to be enabled to be manoeuvred from the active supporting position towards the inactive position.

7. A mobile working machine according to claim 1, wherein the electronic control device (40), when establishing said threshold value (Vth), is configured to take into account the prevailing slewing angle (θ) of the column (22) in relation to the chassis (5) and the horizontal extension length (L) of any other stabilizer leg (10) that is in the active supporting position.

8. A mobile working machine according to claim 7, wherein the mobile working machine (1) comprises a manoeuvring unit (30) with one or more maneuvering members (31) configured to be manoeuvrable by a crane operator to control movements of the crane booms (25, 27) of the crane boom system (24) and movements of the stabilizer legs (10);

the electronic control device (40) is configured to control crane boom movements and stabilizer leg movements on the basis of control signals from the manoeuvring unit (30) related to the manoeuvring of said one or more maneuvering members (31);

at least two different operating modes are provided for the manoeuvring unit (30) and the electronic control device (40), wherein the manoeuvring unit (30) and the electronic control device (40) in a first operating mode are configured to control stabilizer leg movements and in a second operating mode are configured to control crane boom movements; and the mobile working machine (1) comprises switching means (32), of which the crane operator may switch between the first operating mode and the second operating mode.

9. A mobile working machine according to claim 1, wherein the mobile working machine (1) comprises a manoeuvring unit (30) with one or more maneuvering members (31) configured to be manoeuvrable by a crane operator to control movements of the crane booms (25, 27) of the crane boom system (24) and movements of the stabilizer legs (10);

the electronic control device (40) is configured to control crane boom movements and stabilizer leg movements on the basis of control signals from the manoeuvring unit (30) related to the manoeuvring of said one or more maneuvering members (31);

at least two different operating modes are provided for the manoeuvring unit (30) and the electronic control device (40), wherein the manoeuvring unit (30) and the electronic control device (40) in a first operating mode are configured to control stabilizer leg movements and in a second operating mode are configured to control crane boom movements; and the mobile working machine (1) comprises switching means (32), of which the crane operator may switch between the first operating mode and the second operating mode.

10. A mobile working machine according to claim 9, wherein the electronic control device (40) in the first operating mode is configured to establish such a threshold value (Vth) for each stabilizer leg (10) that is in the active supporting position and to compare the prevailing working pressure of the lifting cylinder (26) with each threshold value (Vth) to establish which ones of these stabilizer legs (10) that at present are to be enabled to be manoeuvred from the active supporting position towards the inactive position.

11. A mobile working machine according to claim 9, wherein the electronic control device (40) in the first operating mode is configured to establish such a threshold value (Vth) for a stabilizer leg (10) and compare the prevailing working pressure of the lifting cylinder (26) with this threshold value (Vth) when it has been established by the electronic control device (40), based on control signals from the manoeuvring unit (30), that the crane operator has ordered a manoeuvring of the stabilizer leg in question from the active supporting position towards the inactive position or has selected the stabilizer leg in question for subsequent manoeuvring.

12. A mobile working machine according to claim 10, wherein the electronic control device (40) in the first operating mode is configured to indicate on a display (46) the individual stabilizer legs (10) that at present are enabled to be manoeuvred from the active supporting position towards the inactive position.

13. A mobile working machine (1) according to claim 1, wherein each stabilizer leg (10) is mounted to an outer end of a horizontally extending extension arm (14), the stabilizer leg (10) being extensible in relation to the extension arm (14) in vertical direction by said actuating member (12) of the stabilizer leg, wherein the extension arm (14) is telescopically extensible to allow an adjustment of the horizontal extension length thereof and thereby an adjustment of the horizontal extension length (L) of the associated stabilizer leg (10).

14. A method for supervising the manoeuvring of stabilizer legs (10) included in a mobile working machine (1), where the mobile working machine comprises:

a chassis (5);

two or more stabilizer legs (10) for supporting the mobile working machine (1) against the ground, wherein the stabilizer legs (10) are connected to the chassis (5), each stabilizer leg (10) having an actuating member (12), in the form of a hydraulic cylinder, by which the stabilizer leg is manoeuvrable between an inactive position, in which the stabilizer leg is out of contact with the ground, and an active supporting position, in which the stabilizer leg is in supporting contact with the ground; and a hydraulic crane (20), which is carried by the chassis (5) and comprises:
a crane base (21) fixed to the chassis (5),
a column (22), which is rotatably mounted to the crane base (21) so as to be rotatable in relation to the crane base about an essentially vertical axis of rotation, and
a crane boom system (24) carried by the column (22), wherein the crane boom system (24) comprises at least a first liftable and lowerable crane boom (25), which is articulately connected to the column (22), and a hydraulic lifting cylinder (26) for lifting and lowering the first crane boom (25) in relation to the column (22),
wherein the method comprises the following steps effected by an electronic control device (40) of the mobile working machine:
establishing a maximum allowed working pressure for the lifting cylinder (26) while taking into account the contribution to the stability of the mobile working machine (1) against tipping from each stabilizer leg (10) that is in the active supporting position;
establishing, before a stabilizer leg (10) is enabled to be manoeuvred from the active supporting position towards the inactive position, a threshold value (Vth) corresponding to the value of the maximum allowed working pressure for the lifting cylinder (26) that would ensue in case the stabilizer leg (10) in question is made to leave the active supporting position;
comparing the prevailing working pressure of the lifting cylinder (26) with said threshold value (Vth);
preventing a manoeuvring of the stabilizer leg (10) from the active supporting position towards the inactive position if the prevailing working pressure of the lifting cylinder (26) is higher than said threshold value (Vth); and
enabling a manoeuvring of the stabilizer leg (10) from the active supporting position towards the inactive position if the prevailing working pressure of the lifting cylinder (26) is lower than said threshold value (Vth).

15. A method according to claim 14, wherein the method comprises the following steps effected by the electronic control device (40):
establishing, before two or more stabilizer legs (10) are enabled to be simultaneously manoeuvred from the active supporting position towards the inactive position, a threshold value (Vth) corresponding to the value of the maximum allowed working pressure for the lifting cylinder (26) that would ensue in case the stabilizer legs (10) in question are made to leave the active supporting position;
comparing the prevailing working pressure of the lifting cylinder (26) with said threshold value (Vth);
preventing a simultaneous manoeuvring of the stabilizer legs (10) in question from the active supporting position towards the inactive position if the prevailing working pressure of the lifting cylinder (26) is higher than said threshold value (Vth); and
enabling a simultaneous manoeuvring of the stabilizer legs (10) in question from the active supporting position towards the inactive position if the prevailing working pressure of the lifting cylinder (26) is lower than said threshold value (Vth).

16. A method according to claim 13, wherein the electronic control device (40), when establishing said threshold value (Vth), takes into account the prevailing slewing angle ($\theta$) of the column (22) in relation to the chassis (5) and the horizontal extension length (L) of any other stabilizer leg (10) that is in the active supporting position.

17. A method according to claim 13, wherein the mobile working machine (1) comprises a manoeuvring unit (30) with one or more maneuvering members (31) which are manoeuvrable by a crane operator to control movements of the crane booms (25, 27) of the crane boom system (24) and movements of the stabilizer legs (10), wherein
the electronic control device (40) in a first operating mode controls stabilizer leg movements on the basis of control signals from the manoeuvring unit (30) related to the manoeuvring of said one or more maneuvering members (31), and in a second operating mode controls crane boom movements on the basis of control signals from the manoeuvring unit (30) related to the manoeuvring of said one or more maneuvering members (31), and
the crane operator switches between the first operating mode and the second operating mode by switching means (32).

18. A method according to claim 17, wherein the electronic control device (40) in the first operating mode establishes such a threshold value (Vth) for each stabilizer leg (10) that is in the active supporting position and compares the prevailing working pressure of the lifting cylinder (26) with each threshold value (Vth) to establish which ones of these stabilizer legs (10) that at present are to be enabled to be manoeuvred from the active supporting position towards the inactive position.

19. A method according to claim 17, wherein the electronic control device (40) in the first operating mode establishes such a threshold value (Vth) for a stabilizer leg (10) and compares the prevailing working pressure of the lifting cylinder (26) with this threshold value (Vth) when it has been established by the electronic control device (40), based on control signals from the manoeuvring unit (30), the crane operator has ordered a manoeuvring of the stabilizer leg in question from the active supporting position towards the inactive position or has selected the stabilizer leg in question for subsequent manoeuvring.

20. A method according to claim 18, wherein the electronic control device (40) in the first operating mode indicates on a display (46) the individual stabilizer legs (10) that at present are enabled to be manoeuvred from the active supporting position towards the inactive position.

* * * * *